Jan. 9, 1968

E. J. JEFFERIES 3,362,796

RECOVERY OF SULPHUR FROM ORES

Filed April 19, 1965

INVENTOR.
EDWARD J. JEFFERIES
BY
ATTORNEY

United States Patent Office 3,362,796
Patented Jan. 9, 1968

3,362,796
RECOVERY OF SULPHUR FROM ORES
Edward J. Jefferies, Poole, Dorset, England, assignor to Instituto Centroamericano de Investigación y Tecnología Industrial, Guatemala, Guatemala, a corporation of Guatemala
Filed Apr. 19, 1965, Ser. No. 448,955
5 Claims. (Cl. 23—294)

The present invention is directed to a process for recovering substantially pure sulphur from sulphur-bearing source materials and more particularly to a process for recovering sulphur from ores.

The recovery of sulphur from salt domes is accomplished commercially by the well known Frasch process. Sulphur occurring in natural gas is recovered by oxidation of the hydrogen sulphide, in which form sulphur is present in natural gas. In other lesser used methods of recovery of sulphur, the ore may be heated and the sulphur melted and separated from the refuse by filtration. It may be crushed and the sulphur separated by flotation or air classification techniques. It has been found that none of the above methods is satisfactory for the recovery of sulphur from certain sulphur containing muds, where the presence of colloidal clay obstructs the separation of the sulphur from the mixture.

Figure 1:
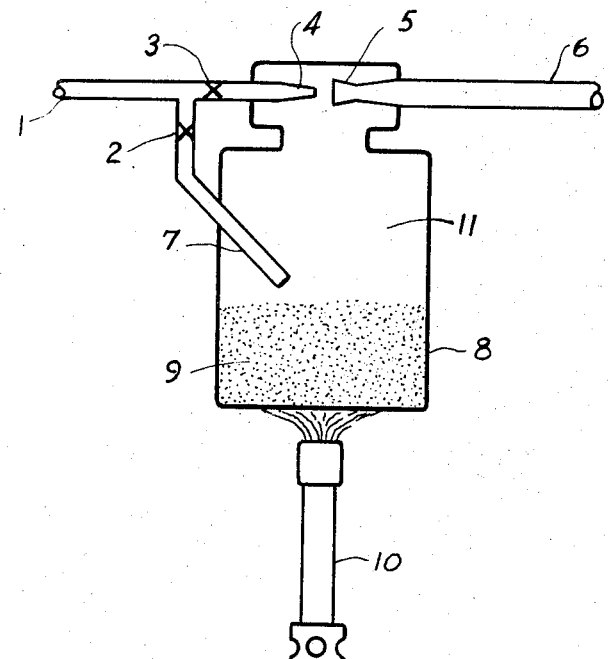
Figure 2:
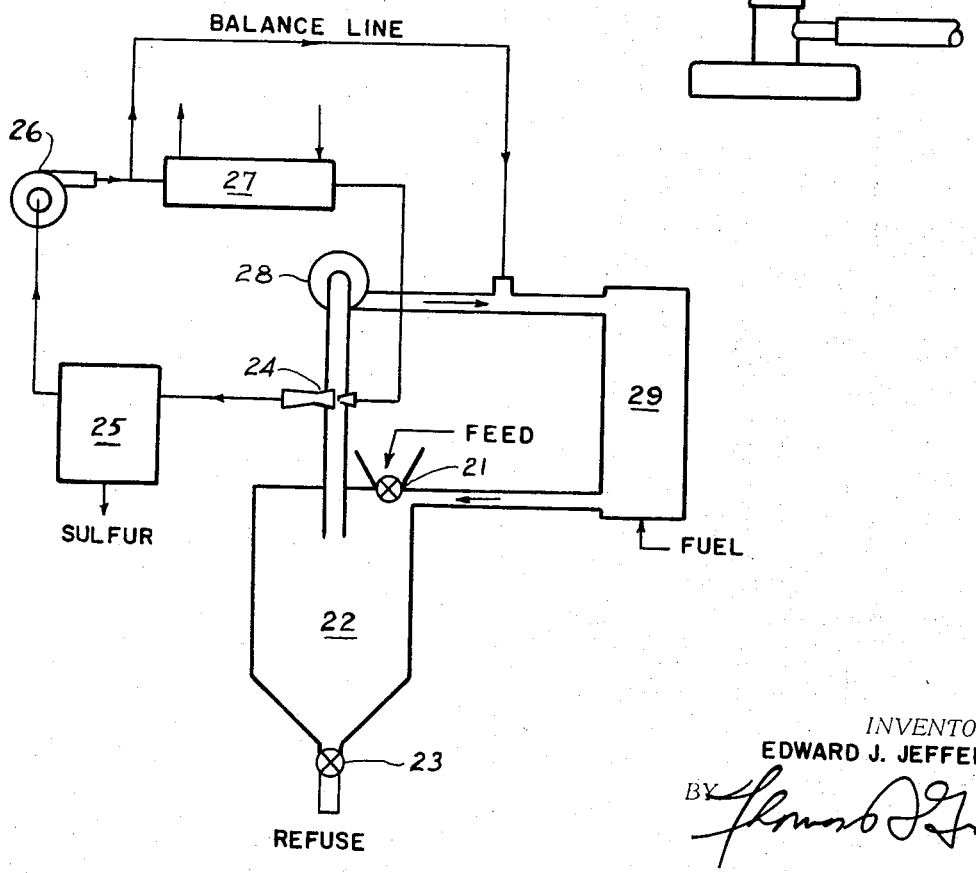

It is the object of the present invention to provide an improved process for recovering sulphur. It is another object of the present invention to provide a process for recovering substantially pure sulphur from a vessel containing sulphur vapors. Other objects and features of the present invention will become apparent from consideration of the following description taken in connection with the accompanying drawings in which:

FIGURE 1 is a schematic drawing of apparatus of one embodiment of the present invention; and FIGURE 2 is a diagrammatic drawing of equipment and process flow of another embodiment of the invention.

The invention is first described in connection with the process and equipment depicted in FIGURE 1. The sulphur bearing mixture 9 is heated in a vessel 8 by means of a heat source 10, the inert gas (preferably nitrogen) is admitted through an inlet pipe 1 and by appropriate setting of the valves 2 and 3, flows in part through the nozzle 4 and in part through the branch tube 7 into the vapor space 11 of the vessel 8. The sulphur vapor produced is drawn into the Venturi 5 by the jet of gas issuing from the nozzle 4 which quenches it to the form of a fog which discharges through tube 6 and from which the pure sulphur may be separated by any known method, e.g. screening through a bag-house type apparatus.

The purpose of the secondary inert gas stream into the pot is to positively sweep the sulphur vapors from the pot and to lower the partial pressure of sulphur in the vapor space. It has also been found that the secondary gas stream into the pot improves the stability of operation of the process as a whole.

The temperature of the outlet gas stream may be kept below the lower melting point of sulphur by adjusting the rate of flow and temperature of the incoming inert gas stream. Since the inert gas used may be too costly to discard after being used once, the recirculation of it, after all or part of the sulphur has been removed, may be required. For the same reason, i.e. economy, mechanical means for continuous feeding of the raw mineral and for the discharge of the refuse may be incorporated in the process.

FIGURE 2 presents one such continuous process incorporating the novel features of this invention. With reference to said FIGURE 2, the dried sulphur containing ore is introduced continuously through the hopper 21 into the cyclone vessel 22 which forms part of the hot loop of the process. The sulphur in the feed is vaporized from the refuse as it falls to the bottom of the cyclone 22 and the refuse is continuously discharged through the valve 23. The sulphur vapor is forced by the stream of inert gas into the Venturi 24, where the sulphur vapor is quenched and forms a fog that passes to a sulphur recovery stage 25, from which pure sulphur is separated. The lean inert gas stream leaves the sulphur recovery stage and is recirculated by the fan 26 through a cooler 27, where the latent heat added to it by condensation of the sulphur is removed and the cold stream of lean gas is again passed through the nozzle 24. The vapors from the cyclone 22 that have not been carried into the cold loop are recirculated by the fan 28 through the gas or oil fired heater 29, where sufficient heat is added to vaporize the sulphur.

In its broadest aspects, the invention comprises maintaining a mixture of sulphur vapor and an inert gas in a closed vessel. A portion of the sulphur vapor is cooled to below the lowest melting point of elementary sulphur, i.e., 106.8° C., by contacting a relatively cold stream of inert gas on a portion of the sulphur vapor, to produce solid or super-cooled liquid particles of sulphur in the form of finely divided particles suspended in the inert gas. These particles in the inert gas have the general appearance of a fog.

As illustrated in the discussion of the drawings, heat may be supplied to the vessel by heating a recirculating portion of the sulphur vapor and inert gas. The term "closed vessel" is meant to include vessels having recirculating loops, such as those illustrated in FIGURE 2. This is often insufficient to maintain the vessel at a temperature sufficient to vaporize all the sulphur in the sulphur-bearing source material. Additional heat may be supplied by heating the external walls of the vessel, or by oxidizing a portion of the sulphur in the vessel by controlled addition of air, or oxygen, or oxygen-enriched air. The temperature in the vessel is preferably between about 370° and 420° C.

The admixture of inert gas with the sulphur vapor in the closed system results in the sulphur vapor being at a partial pressure. It is preferably maintained at a relatively high partial pressure, e.g., between about one-third and two-third atmospheres, when the inert gas is nitrogen at the preferred temperatures. The inert gas may be any gas which is inert to sulphur. Nitrogen is the preferred gas.

The temperature of the jet of inert gas used to solidify the sulphur vapor must be below the lowest melting point of sulphur, 106.8° C. For efficient cooling, it should be below 100° C. It is preferably at a temperature between about 90° C. and 100° C.

The solidification of the sulphur vapor is preferably carried out in the upper portion of the vessel or in a line in which a portion of the sulphur vapor-inert gas mixture is withdrawn from the vessel, as illustrated in FIGURES 1 and 2. The preferred means for solidifying the sulphur vapor and recovering the sulphur is by passing a jet of the cooled inert gas across a space from the source (nozzle) of the jet into an open tube through which the cooled gas and solidified sulphur are discharged. A Venturi tube is the preferred shape for this discharge tube. The apparatus, including the nozzle and the Venturi inlet, are spaced in the stream, or atmosphere, of the sulphur vapor and inert gas. The cool jet of gas causes a portion of the sulphur to solidify and concomitantly entraps this solidified sulphur in the Venturi from which it is recovered. The finely divided sulphur particles in the inert gas may be removed by passing the mixture through a bag house, or similar conventional means for separating solids from gases.

The present invention is primarily useful for recovering sulphur from sulphur-bearing source materials containing elemental sulphur. Such materials are commonly muds, which may have been derived from Tertiary sedimentary rocks. They may also be from other sources, and include impure sulphur mixtures. In processing impure sulfur, the process is essentially a refining process, resulting in a pure product from an impure feed.

As many embodiments of this invention may be made without departing from the spirit and scope thereof, it is to be understood that the invention includes all such modifications and variations as come within the scope of the appended claims.

What is claimed is:

1. The process for recovering sulphur from a closed vessel containing sublimed sulphur vapor and an inert gas comprising, contacting a high velocity jet of an inert gas with a portion of said sulphur vapor,
    (i) said jet of inert gas being at a temperature below about 106° C.,
    (ii) said sulphur vapor being at a temperature significantly above the temperature of said jet of inert gas,
    (iii) said jet of inert gas being directed into a Venturi zone spaced from said jet, and
    (iv) said jet of inert gas and said Venturi zone being positioned in a path communicating with the source of sublimed sulphur vapor, said path opening into the space between the said jet and said Venturi zone, whereby the sulphur vapor is cooled to a temperature which is between 90° and 106.8° C. and above the temperature of said jet of inert gas, and solidified as finally divided particles suspended in the stream of inert gas by which it was cooled, and whereby said solidified particles and said stream of inert gas used to cool said particles enter said Venturi zone, and conducting said stream to a separating zone and separating said sulphur particles from said inert gas.

2. The process of claim 1 wherein the sulphur vapor in the inert gas is formed by heating a sulphur-bearing material selected from the group consisting of sulphur and sulphur ores in a closed vessel, and wherein inert gas is injected into said closed vessel.

3. The process of claim 1 wherein said inert gas is nitrogen, and wherein the temperature of the jet of nitrogen is between 90° and 100° C. and wherein the sulphur vapor is at a temperature between about 370° and 420° C.

4. The process of claim 3 wherein heat is supplied to said sulphur vapor and said resident nitrogen after it is withdrawn from said vessel, and then recirculating heated vapor and nitrogen to said vessel, and wherein residual solid matter is removed by centrifugal force in a recovery zone.

5. The process of claim 4 wherein nitrogen is the inert gas and said sulphur vapor is at a partial pressure of between ⅓ and ⅔ atmosphere.

References Cited

UNITED STATES PATENTS

| | | | |
|---|---|---|---|
| 1,478,750 | 12/1923 | McElroy | 23—227 |
| 1,518,126 | 12/1924 | Reed | 23—294 |
| 1,613,632 | 1/1927 | Wilkinson | 23—294 |
| 1,773,562 | 8/1930 | White | 23—294 |
| 1,919,307 | 7/1933 | Rupprecht | 23—294 |
| 1,992,611 | 2/1935 | Grindrod | 23—312 |
| 2,128,107 | 8/1938 | Tyrer | 23—224 |
| 2,629,133 | 2/1953 | Morningstar | 23—224 |
| 2,860,964 | 11/1958 | Leroi | 23—224 |
| 2,915,369 | 12/1959 | Oaks | 23—254 |

NORMAN YUDKOFF, *Primary Examiner.*

G. HINES, *Assistant Examiner.*